United States Patent [19]

Norwood et al.

[11] 4,312,967

[45] Jan. 26, 1982

[54] POLYMERIZATION CATALYST AND PROCESS

[75] Inventors: Donald D. Norwood; Jackie C. Watts, both of Bartlesville, OK

[73] Assignee: Phillips Petroleum Co., Bartlesville, Okla.

[21] Appl. No.: 118,894

[22] Filed: Feb. 6, 1980

[51] Int. Cl.³ .......................... C08F 4/24; C08F 10/02
[52] U.S. Cl. ..................................... 526/64; 252/430; 526/106
[58] Field of Search .................. 252/430 R; 526/105, 526/106, 64

[56] References Cited

U.S. PATENT DOCUMENTS

| | | | |
|---|---|---|---|
| 2,825,721 | 3/1958 | Hogan et al. | 526/106 |
| 2,951,816 | 9/1960 | Hogan et al. | 252/467 |
| 3,232,913 | 2/1966 | Weynbergh et al. | 526/106 |
| 3,476,724 | 11/1969 | Hogan et al. | 526/105 |
| 3,484,428 | 12/1969 | Kollenbach | 526/106 |
| 3,622,521 | 11/1971 | Hogan et al. | 526/106 |
| 3,625,864 | 12/1971 | Horvath | 526/102 |
| 3,658,777 | 4/1972 | Green | 526/106 |
| 3,780,011 | 12/1973 | Pullukat et al. | 526/106 |
| 3,798,202 | 3/1974 | Nasser | 526/106 |
| 3,879,362 | 4/1975 | Chalfont et al. | 526/106 |
| 3,882,096 | 5/1975 | Shida et al. | 252/430 |
| 3,887,494 | 6/1975 | Stietz | 252/452 |
| 3,900,457 | 8/1975 | Witt | 526/106 |
| 3,947,433 | 3/1976 | Witt | 526/105 |
| 4,041,224 | 8/1977 | Hoff et al. | 526/106 |
| 4,049,896 | 9/1977 | Rekers et al. | 526/129 |
| 4,119,773 | 10/1978 | Speca | 526/106 |
| 4,151,122 | 4/1979 | McDaniel et al. | 252/458 |
| 4,169,926 | 10/1979 | McDaniel | 526/106 |
| 4,173,548 | 11/1979 | Pullukat | 252/430 |

*Primary Examiner*—Edward J. Smith

[57] ABSTRACT

An olefin polymerization catalyst is provided comprising chromium oxide on a titanium-containing silica support having at least about 3 weight percent titanium in combination with an organoboron promoter. The titanium may be incorporated by coprecipitation with the silica gel or added anhydrously or nonanhydrously to the silica gel. The polymerization process comprises the contacting of olefin monomer with the titanium-containing chromium oxide catalyst in the presence of an organoboron promoter.

33 Claims, No Drawings

POLYMERIZATION CATALYST AND PROCESS

BACKGROUND OF THE INVENTION

This invention relates to modified supported chromium oxide olefin polymerization catalysts.

It further relates to a method of making ethylene polymers and copolymers.

Supported chromium oxide catalysts have been used for many years in the polymerization of olefins. Ethylene can be polymerized by contacting the monomer with a silica-supported chromium oxide catalyst; the reaction being carried out in an inert liquid at temperatures below 130° C. for producing solid polymer suspended in the liquid or at temperatures above 130° C. for solution polymerization. The properties of the resulting polymer depend upon a number of factors, including the type of catalyst employed and its activation temperature, the reaction pressure, and the reaction temperature. It is generally known that titanium can be added to the supported chromium oxide catalyst to produce a polymer having an increased melt index. It is also generally known that certain substances called promoters or adjuvants can be used in combination with chromium oxide catalysts to modify the properties of the polymer. The use of chromium catalysts with certain organoboron promoters is known generally to broaden the molecular weight distribution and improve the environmental stress crack resistance of polymers made using these catalysts as well as to increase the catalyst productivity.

Attempts have been made to obtain ethylene polymers having the high productivity and the improved environmental stress crack resistance imparted by organoboron promoters and the increased melt index potential obtained with chromium oxide-silica catalysts containing titanium. When commercial cogel catalysts containing 2.0 to 2.5 weight percent titanium were employed with triethylborane (TEB) as a promoter, the resulting polymers exhibited reduced density, which resulted in ethylene polymers which lacked the high stiffness desired for blow molding and injection molding applications. It is believed that the use of the organoboron compound with chromium oxide catalysts containing about 2.5 weight percent or less titanium results in the production of a small amount of 1-butene and 1-hexene from the ethylene monomer. These higher olefins are incorporated into the polymer chain, reducing the density by disrupting the linear polymer structure. In polymerization processes in which ethylene monomer is recycled to the reactor, the presence of these higher olefins may necessitate a fractionation step to separate the accumulated butene and hexene from the ethylene monomer. When ethylene is copolymerized with other monomers, the generation of higher olefins in the reactor complicates the process of maintaining the ethylenecomonomer ratio and thereby producing polymer having a predictable density.

It is therefore an object of this invention to provide an improved chromium oxide polymerization catalyst.

It is a further object to provide a process by which high-density ethylene polymers having a high melt index and good stress crack resistance are prepared in high yield.

It is a further object of the invention to minimize the production of higher olefins during the polymerization process.

SUMMARY OF THE INVENTION

According to one embodiment of the invention, a polymerization catalyst is provided which comprises chromium oxide on a silica-titania support containing at least about 3 weight percent titanium in combination with an organoboron promoter. Further according to the invention, an ethylene polymer or copolymer is produced by contacting an ethylene monomer with an activated catalyst comprising silica-supported chromium oxide containing at least about 3 weight percent titanium in the presence of an organoboron promoter. The resulting polymer is produced in high yield and has a combination of properties including high shear response, good environmental stress crack resistance, and high density.

DETAILED DESCRIPTION OF THE INVENTION

The silica-containing substrates used in the invention catalyst are silica or silica-alumina gels. Such gels conventionally are prepared by mixing an acid such as sulfuric acid with an aqueous solution of an alkali metal silicate such as sodium silicate to produce an aqueous gel, or hydrogel. The silicate is preferably added to the acid, and the reaction mixture is strongly agitated. The mixing temperature can range from about 1° to 43° C. The resulting hydrogel is approximately 3 to 12 weight percent $SiO_2$ and has a pH in the range of about 3 to 9. The hydrogel is aged at a temperature of about 18° to 98° C. for a suitable time, generally more than one hour. Silica gels often have a minor portion, generally not exceeding 20 weight percent, of alumina or other metal oxides, and the support of the invention includes composite silica gels comprising silica and alumina, thoria, zirconia and like substances.

The hydrogel is then washed with water and either an ammonium salt solution or a dilute acid to reduce the alkali metal content of the gel to less than about 0.1 weight percent. The ammonium salt solution is preferably one such as ammonium nitrate or an ammonium salt of an organic acid which volatizes upon subsequent calcination.

The water in the hydrogel can be removed by a conventional method such as repeated washing with an organic compound soluble in water, azeotropic distillation in the presence of an organic compound, or heating by a method such as spray drying, vacuum oven drying, or air-oven drying at temperatures up to about 425° C. If the hydrogel is dried by heating, it may be necessary to add an agent to the gel to prevent shrinkage of the pores. This pore-preserving agent can be incorporated in one of the ingredients used to make the silica hydrogel, but it is preferably incorporated into the hydrogel after the washing step to avoid loss of the agent during washing. The pore-preserving agent can be selected from a variety of substances such as oxygen-containing organic compounds selected from polyhydric alcohols, mono- and dialkyl ethers of ethylene glycol, and poly-(alkylene)glycol; anionic, cationic and nonionic surfactants; organic silicon compounds such as triarylsilanols as disclosed in Ser. No. 914,258, filed June 9, 1978; and combinations of the oxygen-containing compounds with a normally liquid hydrocarbon such as n-heptane or kerosene and, optionally, a surfactant. An alternate group of pore-preserving agents includes certain inorganic and organic acids used at a specified level of pH. The hydrogel is contacted with the acid in an amount sufficient to impart to the mixture a pH ranging generally from about 0 to about 3.5, preferably about 2.2 or below. Suitable acids are those which are water soluble, sufficiently ionized to produce the pH level required in the hydrogel, and are not harmful to the silica or the polymerization. For the production of ethylene polymerization catalysts, suitable inorganic acids include, for example, hydrochloric acid, hydrobromic acid, hydroiodic acid, nitric acid, sulfamic acid, sulfuric acid, orthophosphoric acid and iodic acid. Suitable organic acids include, for example, acetic acid, formic acid, tartaric acid, citric acid, maleic acid, malic acid, malonic acid, succinic acid, gluconic acid, diglycolic acid, ascorbic acid, cyclopentane tetracarboxylic acid, and benzenesulfonic acid. In general, the organic acids having suitable water solubility, stability, acid strength, and nondeleterious action also have pK values of about 4.76 or less as disclosed in Lange's Handbook of Chemistry, 11th Edition (1973), Tables 5-7, 5-8. That is, their acid strength is equal to or greater than that of acetic acid. Acids such as sulfuric acid and hydrochloric acid are generally preferred because of their availability, cost, strength and effectiveness in the process. The nonionic surfactant is the presently preferred pore-preserving agent for reasons of economy and effectiveness.

If used, the oxygen-containing pore preserving agent is present in an amount such that the weight ratio of the oxygen-containing compound to hydrogel ranges from about 5:1 to 0.5:1. When a normally liquid hydrocarbon is used with the oxygen-containing organic compound, the weight ratio of hydrocarbon to organic compound can range from about 0.5:1 to 20:1. When a surfactant is used with the hydrocarbon/oxygen-containing organic compound, generally about 0.1 to 5 weight percent surfactant is used based on the weight of the hydrocarbon/oxygen-containing organic compound mixture. If a surfactant or an organic silicon compound is used as the silica pore structure preserving agent, the weight ratio of hydrogel to surfactant or organic silicon compound can range from about 20:1 to 500:1, preferably about 40:1 to 100:1. Sufficient treatment time is allotted for the agent to occupy the pores of the gel, generally about 30 seconds to 10 hours. The use of certain pore-preserving agents such as the oxygen-containing compounds is disclosed in U.S. Pat. No. 4,169,926, the disclosure of which is hereby incorporated by reference. The treated hydrogel is then dried to remove the liquids. The drying procedure produces a porous silica gel which is substantially free of water, or xerogel, which can then be used as a substrate for the other components of the catalyst system.

Titanation of the silica can be effected using a variety of methods. The titanated catalyst must contain at least about 3 weight percent titanium based on the weight of the catalyst (not including the organoboron component) after calcining. All or part of the titanium can be supplied by coprecipitation of silica and titania. In the coprecipitation method, a titanium compound such as a titanium halide, nitrate, sulfate, oxalate, or alkyl titanate, for example, is incorporated with the acid or the silicate in an amount such that the amount of titanium present as titanium dioxide in the final calcined catalyst is at least about 3 weight percent. The amount of titanium in the calcined catalyst will generally be about 3 weight percent to about 10 weight percent, preferably within the range of about 3.0 to 4.0 weight percent. The coprecipitation of titania with silica is disclosed in U.S. Pat. No. 3,887,494, the disclosure of which is hereby incorporated by reference.

Titanation of the catalyst support can alternatively be effected by impregnation of the hydrogel or xerogel before or after incorporation of the chromium component of the catalyst system. For example, an aqueous solution of a hydrolysis-resistant titanium compound can be incorporated into a silica hydrogel and dried by conventional techniques, preferably after incorporation of a pore-preserving agent as discussed above. Suitable hydrolysis-resistant compounds include certain titanium chelates, particularly alkanolamine titanates such as triethanolamine titanate, which is available commercially as Tyzor-TE$^{(R)}$.

Titanation of the silica support can also be accomplished by adding a titanium compound to the silica xerogel, usually with heat to vaporize the solvent and cause titanium to be deposited on the support. Suitable titanium compounds for impregnation of the silica xerogel include the hydrolysis-resistant titanium chelates discussed above; titanium hydrocarbyloxides containing from 1 to about 12 carbon atoms per hydrocarbon group such as titanium alkoxides including titanium tetramethoxide, titanium tetraethoxide, titanium tetraisopropoxide, titanium tetradodecyloxide, titanium tetracyclohexyloxide, titanium tetraphenoxide; and titanium tetrahalides. Water-sensitive compounds such as titanium tetraisopropoxide are applied neat or dissolved in a nonaqueous solvent such as n-hexane. Water-tolerant compounds such as triethanolamine titanate can be applied in an aqueous or non-aqueous solvent. To incorporate the titanium into the support, the xerogel can be slurried with a nonaqueous solution or slurry of the titanium compound while heating the mixture moderately at temperatures up to about 150° C. to remove the solvent or diluent, and then activating as described below. The invention also includes catalysts in which a silica-titania gel containing less than 3 weight percent titanium is impregnated with a titanium compound to bring the total amount of titanium to a level of at least about 3 weight percent.

The presently preferred method of titanation of the support is to add a titanium compound, preferably neat titanium tetraisopropoxide, to a silica xerogel in a fluidized bed prior to activation of the catalyst. The xerogel preferably contains chromium incorporated into the silica hydrogel as an aqueous solution of chromium acetate or chromium oxide prior to drying the hydrogel. The gel is placed in an activator, fluidized with dry nitrogen gas, and heated to about 100° to 200° C. for about 2 hours. The titanium compound is added slowly to the fluidized catalyst while purging with dry nitrogen at the elevated temperature. The treated catalyst can then be activated by heating at about 400° to about 1000° C. in dry air as described below.

The chromium component of the catalyst comprises about 0.001 to about 10 weight percent chromium, preferably about 0.1 to about 5 weight percent, based on the weight of the calcined catalyst. The chromium component can be coprecipitated with the silica or the silicatitania or added by means of an nonaqueous solution of a chromium compound such as tertiary butyl chromate to the xerogel, but it is preferably introduced by incorporating an aqueous solution of a watersoluble chromium compound into the hydrogel after washing the hydrogel to remove alkali metal ions. Suitable chromium compounds include chromium acetate, chromium nitrate, chromium sulfate, chromium trioxide, ammonium chromate or any other chromium compound which can be converted to chromium oxide by calcination, with at least part of the chromium being converted to the hexavalent state. As used herein, the term "chromium oxide", as used to describe the chromium compound present in the catalyst after calcining, includes fixed surface chromates formed by the reaction of chromium oxide and silica, as discussed in Hogan, J. Poly. Sci. A-1, 8, 2637–2652 (1970). The chromium compound is employed in an amount so as to provide the desired weight percent chromium in the final catalyst.

The catalyst is activated by calcining at a temperature within the range of about 400° to 1000° C. in a dry atmosphere containing oxygen, usually dry air, for a time of about 10 minutes to 20 hours or longer. The activation can follow titanation of the catalyst in the activator, as described above, by heating the fluidized catalyst sample to about 316° C., substituting dry air for the nitrogen atmosphere present during titanation, raising the temperature to at least about 400° C., and calcining the fluidized catalyst at this elevated temperature for the chosen activation time. The catalysts of the invention can also be activated for polymerization by a method involving sequential calcining in a nonoxidizing atmosphere such as carbon monoxide and an oxygen-containing atmosphere such as dry air, as disclosed in U.S. Pat. No. 4,151,122, the disclosure of which is hereby incorporated by reference. Following activation, the catalyst is stored in a dry atmosphere until used.

The organoboron compounds used as promoters with the silicatitania chromium oxide catalyst of the invention can be expressed as $BR_3$, wherein each R is selected independently from hydrogen, alkyl, cycloalkyl and aryl, at least one R in each compound being a hydrocarbon radical having from 1 to 12 carbon atoms, with the total number of carbon atoms not exceeding 30 in each compound. Examples of suitable boron promoters include trimethylborane, triethylborane, tri-n-dodecylborane, tricyclohexylborane, tri(2-methylcyclopentyl)borane, triphenylborane, tribenzylborane, tri(2-ethylphenyl)borane, methyldiethylborane, and like compounds. Boron compounds such as diborane which form the organoboron compound in situ on contact with the olefin monomer(s) are also suitable. The trialkylboranes are presently preferred because of their availability. The amount of boron compound used is generally within the range of about 0.3 to about 15 weight percent preferably about 0.5 to about 13 weight percent, based on the weight of the calcined catalyst fed to the reactor. In a continuous particle form process using a loop reactor, for example, it is convenient to introduce the organoboron compound as a separate stream into the reactor, either continuously or in pulses, as a dilute solution in an inert hydrocarbon, e.g., 0.1 weight percent in isobutane. The concentration of the organoboron compound can also be expressed in parts per million based on the diluent used in the polymerization reactor. The weight percent ranges given above correspond to a range of about 0.1 to about 12 ppm organoboron compound, based on the amount of diluent charged per hour in a continuous particle form process using a loop reactor.

The catalyst of the invention is suitable for the production of normally solid ethylene homopolymer and copolymers, preferably in a particle-form process. Ethylene can be copolymerized with one or more aliphatic mono-1-olefins containing from 3 to about 10 carbon atoms and/or a conjugated diolefin containing from 4 to about 12 carbon atoms. In such polymers the ethylene content generally ranges from about 90 to about 99.9 mole percent. Examples of the polymers which can be produced include polyethylene, ethylene/1-butene copolymers, ethylene/1-hexene copolymers, ethylene/1,3-butadiene copolymers, ethylene/propylene copolymers and ethylene/propylene/1,3-butadiene terpolymers. The polymers can be fabricated by conventional plastics processes such as blow molding and injection molding into various useful articles such as film, bottles, fibers, and pipes.

Polymerization according to the process of the invention can be conducted batchwise in a stirred reactor or continuously in a loop reactor or series of reactors. The monomer(s) can be polymerized by contact with the invention catalyst systems under particle form, solution or gas phase conditions at temperatures ranging from about 20° to 200° C. and pressures from about atmospheric to about 6.9 MPa (1000 psia) or higher.

It is preferred to conduct the polymerization under particle form conditions to obtain the polymer in the form of discrete, solid particles suspended in the reaction medium. This can be accomplished by conducting the polymerization in the presence of a dry inert hydrocarbon diluent such as isobutane, n-heptane, methylcyclohexane, or benzene at a reactor temperature within the range of about 60° to about 110° C. and a reactor pressure of about 1.7 to about 4.1 MPa (250 to 600 psia). The polymer can be recovered, treated with $CO_2$ or $H_2O$, for example, to deactivate residual catalyst, stabilized with an antioxidant such as butylated hydroxy toluene (BHT), and dried by conventional methods to obtain the final product. Hydrogen can be used in the reactor as known in the art to provide some control of the molecular weight of the polymer.

EXAMPLE I

Catalyst Titanation and Activation

Catalysts prepared in three different ways were used in the example polymerization runs. Catalysts A in Table I were cogel catalysts prepared by coprecipitation of an aqueous sodium silicate solution with sulfuric acid containing sufficient titanyl sulfate to obtain a series of catalysts (after activation) containing about 2 to about 2.5 weight percent titanium as the dioxide. The hydrogel cogels were impregnated with sufficient aqueous chromium trioxide to provide about 1 weight percent chromium on the final activated catalysts and were dried by azeotropic distillation with ethyl acetate. These chromium oxide cogel catalysts are commercially available materials.

Catalyst B is a catalyst containing about 1 weight percent chromium, the remainder being silica and about 0.1 weight percent alumina. The catalyst is prepared by spray-drying a silica hydrogel having about 20 weight percent solids and containing an aqueous solution of chromium acetate sufficient to give 1 weight percent chromium in the final dried catalyst.

Catalyst C is similar to catalyst B, except the silica hydrogel was spray dried in the presence of 3 weight percent Siponic(R) F-300 (polyoxyethylated (30) t-octylphenol), a liquid nonionic surfactant sold by Alcolac Inc., Baltimore, Md.

Two titanation methods were used in titanating the above catalysts. In method I, the catalyst sample was placed in an activator 7.62 cm in diameter, and titanium in the form of neat titanium tetraisopropoxide was slowly added to the fluidized catalyst sample while purging with dry nitrogen at 300° F. (149° C.). The treated catalyst was then heated to 600° F. (316° C.), dry air was then substituted for the nitrogen, the temperature was raised to the activation temperature shown in Table I, and calcining at that temperature was continued for 6 hours using a superficial air velocity of about 0.16 ft./sec. (4.9 cm/sec). Following activation, the recovered catalyst was stored in a dry atmosphere until ready for use.

In titanation method II, dry samples of catalyst B were slurried with an aqueous solution of a commercially available triethanolamine titanate (du Pont's Tyzor-TE) sufficient to supply the calculated amount of titanium, based on the weight of the calcined catalyst. The slurry was dried and the product activated as previously described by calcining in air at an elevated temperature.

EXAMPLE II

Ethylene Polymerization

Ethylene was polymerized in a continuous process in an 87-liter pipe loop reactor using samples of the catalysts of Example I. Isobutane was used as the diluent, and an operating pressure of about 3.65 MPa was maintained. Catalyst as a slurry in dry isobutane was intermittently charged to the reactor as required in 0.2 mL increments at the rate of about 10 to 30 additions per hour. Ethylene, isobutane, comonomer, if used, and a 0.1 weight percent solution of triethylborane in isobutane were supplied to the reactor as required. Reactor effluent was intermittently discharged and passed to a chamber where volatiles were flashed off. The polymer was recovered and dried to determine catalyst productivity. Polymer samples were stabilized with a conventional antioxidant system, and the polymer melt index (ASTM D 1238-65T, condition E), high load melt index (ASTM D 1238-65T, condition F), and density (ASTM D 1505-68) were determined.

The nature of the catalysts used, reactor conditions and results obtained are presented in Table I.

weight percent titanium with a triethylborane promoter without the reduction in polymer density which generally results from using a TEB promoter with a catalyst having less titanium. The improvement is realized with catalysts containing at least about 3 weight percent titanium regardless of whether the titanium was incorporated in a single step or incorporated by coprecipitation and subsequent addition of an amount needed to bring the total titanium to at least about 3 weight percent, as an invention Run 5. The use of the invention catalyst permits the production of ethylene homopolymer having the desired density of at least about 0.960 g/cc without the necessity of hexane removal by thermal fractionation.

Control Runs 2 and 3 show the results of polymerizations conducted using cogel catalysts containing less than 3 weight percent titanium with TEB in the reactor. The density of the resulting polymer, 0.954 g/cc, suggests that ethylene homopolymer was not being formed, since homopolymer densities are generally at least about 0.96 g/cc. Comparisons of Runs 2 and 3 with Run 4 in which no TEB was used, and Run 7 (no TEB, density of 0.964) and Run 8 (4.3 ppm TEB, density of 0.955) and Run 9 (8.0 ppm TEB, density of 0.956) show that the addition of TEB tends to depress polymer density while generally increasing catalyst productivity. The use of TEB in combination with at least 3 weight percent titanium permitted the recovery of polymers having densities above 0.960 g/cc. Invention Run 14 shows that ethylene/1-hexene copolymers can be prepared with the invention catalyst.

We claim:

1. A polymerization catalyst comprising, in combination,
   (a) chromium oxide;
   (b) a silica support;
   (c) titanium dioxide, titanium being present in an amount within the range of about 3.0 to about 4.0 weight percent based on the weight of components a, b and c;
   and
   (d) an organoboron compound of the formula BR$_3$

TABLE I

| | Catalyst | | | | Reactor Conditions | | | | Catalyst Productivity | Polymer Properties | | |
|---|---|---|---|---|---|---|---|---|---|---|---|---|
| Run No. | Catalyst No. | Titanation Method | Total Ti Wt. % | Activ. Temp. °C. | TEB ppm | Wt. % 1-Hexene | Temp. °C. | Res. Time Hrs | g polymer/g Catalyst | HLMI (MI) | Density g/cc | (Fluff) Remarks |
| 1 | A | coprec. | 2.5 | 704 | 9.6 | 2.7 | 92.9 | 1.29 | 5200 | (0.14) | 0.951 | control |
| 2 | A | coprec. | 2.5 | 704 | 7.3 | 0 | 102.7 | 1.27 | 6700 | (0.15) | .954 | control |
| 3 | A | coprec. | 2.0 | 704 | 4.1 | 0 | 104.6 | 1.57 | 6300 | (0.17) | .954 | control |
| 4 | A | coprec. | 2.2 | 704 | 0 | 0 | 109.8 | 1.69 | 6300 | (0.70) | .961 | control |
| 5 | A | I[a] | 3.0 | 677 | 3.4 | 0 | 99.4 | 1.28 | 7400 | 10.2 | .961 | invention |
| 6 | B | none | 0 | 760 | 0 | 0 | 108.4 | 1.27 | 3900 | (0.64)[b] | .966 | control |
| 7 | B | none | 0 | 760 | 0 | 0 | 107.2 | 1.01 | 2700 | (0.73) | .964 | control |
| 8 | B | none | 0 | 760 | 4.3 | 0 | 104.6 | 1.27 | 7100 | 11.5 | .955 | control |
| 9 | B | none | 0 | 649 | 8.0 | 0 | 101.8 | 1.28 | 5600 | 9.1 | .956 | control |
| 10 | B | I | 3.0 | 677 | 4.2 | 0 | 98.7 | 1.27 | 8200 | 8.8 | .963 | invention |
| 11 | B | I | 3.0 | 816 | 3.1 | 0 | 97.2 | 1.26 | 5000 | 9.3 | .961 | invention |
| 12 | B | I | 3.0 | 593 | 3.2 | 0 | 102.2 | 1.28 | 6700 | 8.4 | .962 | invention |
| 13 | B | II | 3.0 | 677 | 4.3 | 0 | 98.3 | 1.27 | 6400 | 5.8 | .961 | invention |
| 14 | B | II | 3.0 | 677 | 4.1 | 6.3 | 91.1 | 1.25 | 4800 | 10.2 | .950 | invention |
| 15 | B | II | 3.0 | 677 | 4.1 | 0 | 101.1 | 1.27 | 6700 | 9.9 | .962 | invention |
| 16 | C | I | 3.0 | 677 | 4.4 | 0 | 98.6 | 1.27 | 6700 | 15.5 | .963 | invention |
| 17 | C | I | 3.0 | 816 | 0 | 0 | 108.9 | 1.26 | 2200 | (3.1) | .963 | control |
| 18 | C | I | 4.0 | 649 | 4.1 | 0 | 100.2 | 1.27 | 7100 | 10.5 | .963 | invention |

[a]Initial Ti level is 2 wt. %.
[b]Properties determined from pelletized resin in run 6.

The data outlined in the table show that ethylene polymers can be prepared in high yields using a chromium oxide-silica catalyst having at least about 3 wherein each R is selected independently from hydrogen, alkyl, cycloalkyl and aryl, at least one R is a hydrocarbon radical having from 1 to 12 carbon atoms, and the total number of carbon atoms in the organoboron compound does not exceed 30.

2. The polymerization catalyst of claim 1 in which at least a portion of the chromium is in the hexavalent state.

3. The polymerization catalyst of claim 2 in which chromium is present in an amount of from about 0.001 to about 10.0 weight percent based on the weight of components a, b, and c.

4. The polymerization catalyst of claim 1 in which the organoboron compound is selected from the group consisting of trimethylborane, triethylborane, tri-n-dodecylborane, tricyclohexylborane, tri(2-methylcyclopentyl)borane, triphenylborane, tribenzylborane, tri(2-ethylphenyl)borane, and methyldiethylborane.

5. The polymerization catalyst of claim 3 in which the organoboron compound is triethylborane and the chromium is present in an amount within the range of about 0.1 to about 5 weight percent.

6. The polymerization catalyst of claim 1 in which the organoboron compound is present in an amount within the range of about 0.3 to about 15 weight percent based on the weight of components a, b and c.

7. The polymerization catalyst of claim 6 in which the organoboron compound is present in an amount within the range of about 0.5 to about 13 weight percent based on the weight of components a, b and c.

8. The polymerization catalyst of claim 2 which further comprises a minor amount of a compound selected from the group consisting of alumina, thoria, and zirconia.

9. A polymerization catalyst prepared by a method comprising contacting, under particle-form polymerization conditions in a polymerization reactor, in the presence of at least one polymerizable monomer a first catalyst component comprising a silica support containing chromium oxide at least a portion of which is in the hexavalent state and titanium dioxide, titanium being present in an amount within the range of about 3 weight percent to about 10 weight percent based on the weight of the first catalyst component, with a second catalyst component comprising an organoboron compound represented by the formula $BR_3$ wherein each R is selected independently from hydrogen, alkyl, cycloalkyl and aryl, at least one R is a hydrocarbon radical having from 1 to 12 carbon atoms, and the total number of carbon atoms in the organoboron compound does not exceed 30.

10. The polymerization catalyst of claim 9 in which the organoboron compound is selected from triethylboron and triphenylboron.

11. The polymerization catalyst of claim 9 in which chromium is present in an amount of from about 0.1 to about 5 weight percent based on the weight of the first catalyst component.

12. The polymerization catalyst of claim 11 in which the titanium is present in an amount within the range of about 3.0 to about 4.0 weight percent.

13. The polymerization catalyst of claim 12 in which the first and second catalyst components are contacted in the presence of ethylene monomer at a temperature within the range of about 60° to about 110° C. and a pressure within the range of about 1.7 to about 4.1 MPa.

14. The polymerization catalyst of claim 13 in which the second catalyst component further comprises a hydrocarbon diluent.

15. The polymerization catalyst of claim 14 in which the second catalyst component consists essentially of the organoboron compound and the hydrocarbon diluent.

16. The polymerization catalyst of claim 15 in which the ethylene monomer is present in a hydrocarbon diluent and the organoboron compound is present in an amount within the range of about 0.1 to about 12 ppm based on the amount of hydrocarbon diluent.

17. The polymerization catalyst of claim 13 in which the first and second catalyst components are contacted in the presence of at least one comonomer selected from 1-butene, 1-hexene, 1,3-butadiene and propylene.

18. The polymerization catalyst of claim 16 in which the organoboron compound is triethylborane present in an amount of about 3 ppm.

19. The polymerization catalyst of claim 16 in which the organoboron compound is triethylboron present in an amount of about 4 ppm.

20. The polymerization catalyst of claim 1, 9 or 12 in which the first catalyst component is prepared by a process comprising:
contacting a chromium-containing silica xerogel in a fluidized bed in the presence of nitrogen gas at a temperature of from about 100° to about 200° C. with a titanium compound so as to incorporate the titanium compound into the silica xerogel and
heating the thus-treated silica xerogel in a substantially dry oxygen-containing atmosphere at a temperature of from about 400° to about 1000° C. for at least about ten minutes.

21. The polymerization catalyst of claim 20 in which the titanium compound is titanium tetraisopropoxide.

22. A polymerization process comprising contacting at least one polymerizable olefin monomer under polymerization conditions with the catalyst of claim 1, 2, 3, 4, 5, 6, 7 or 8.

23. A polymerization process comprising contacting ethylene monomer with a first catalyst component comprising a silica support, chromium oxide at least part of which is in the hexavalent state, and titania, the amount of titanium in the first catalyst component being within the range of about 3 weight percent to about 10 weight percent based on the weight of the first catalyst component, and a second catalyst component consisting essentially of an organoboron compound of the formula $BR_3$ wherein each R is selected independently from hydrogen, alkyl, cycloalkyl and aryl, at least one R is a hydrocarbon radical having from 1 to 12 carbon atoms, and the total number of carbon atoms in the organoboron compound does not exceed 30 in an inert diluent at a temperature within the range of 20° to 200° C.

24. The polymerization process of claim 23 in which the titanium is present in the first catalyst component in an amount within the range of about 3.0 to about 4.0 weight percent.

25. The polymerization process of claim 23 in which the titanium is present in the first catalyst component in an amount within the range of about 3.0 to about 4.0 weight percent and the organoboron compound is triethylborane.

26. The polymerization process of claim 23 in which the resulting polymer has a density of at least 0.960 g/cc.

27. The polymerization process of claim 23 in which the polymerization is conducted in a continuous particle-form process.

28. The polymerization process of claim 27 in which the polymerization is conducted in a loop reactor.

29. The polymerization process of claim 28 in which the organoboron compound is introduced into the loop reactor in an amount of about 0.3 to about 15 weight percent based on the weight of the first catalyst component.

30. The polymerization process of claim 28 in which the organoboron compound is introduced into the loop reactor in an amount of about 0.1 to about 12 ppm based on the amount of inert diluent charged per hour.

31. The polymerization process of claim 23 or 30 in which the inert diluent is isobutane.

32. The polymerization process of claim 23, 25, 26, 27 or 30 in which ethylene is copolymerized with a monomer selected from copolymerizable 1-olefins and conjugated diolefins.

33. The polymerization process of claim 23 in which the first catalyst component further comprises a minor amount of a compound selected from alumina, thoria and zirconia.

* * * * *

UNITED STATES PATENT AND TRADEMARK OFFICE
CERTIFICATE OF CORRECTION

PATENT NO. : 4,312,967

DATED : January 26, 1982

INVENTOR(S) : Donald D. Norwood et al.

It is certified that error appears in the above-identified patent and that said Letters Patent is hereby corrected as shown below:

Column 9, claim 6, line 21, "1" should be --- 3 ---.

Signed and Sealed this

Seventh Day of September 1982

[SEAL]

Attest:

GERALD J. MOSSINGHOFF

Attesting Officer     Commissioner of Patents and Trademarks